Sept. 8, 1959 — C. O. HOLYCROSS ET AL — 2,903,236
REINFORCED NON-POROUS VALVE BODY
Filed March 21, 1955 — 2 Sheets-Sheet 1
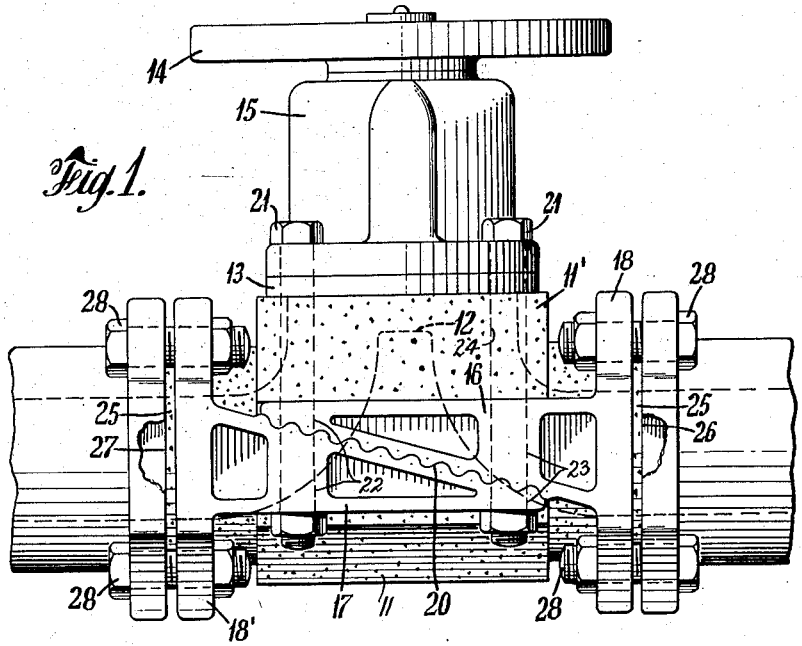
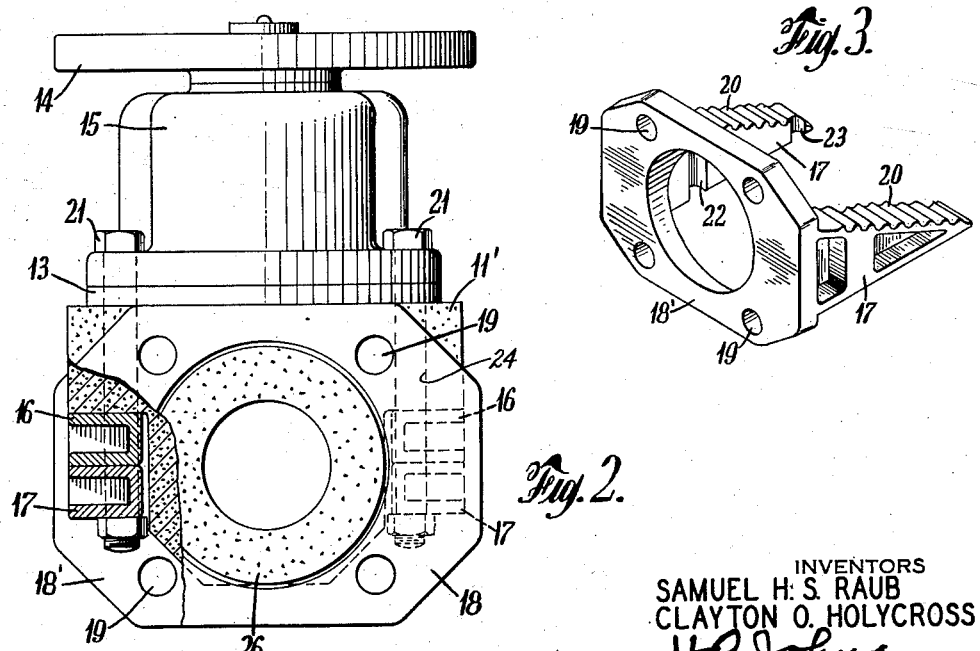
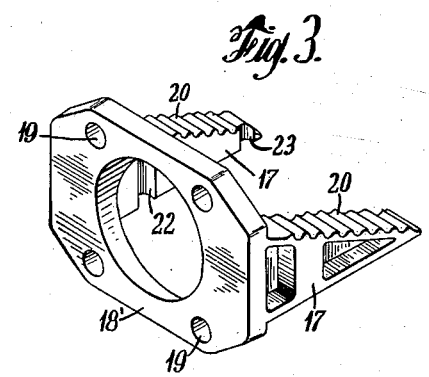
INVENTORS
SAMUEL H. S. RAUB
CLAYTON O. HOLYCROSS
BY H. R. Johns
ATTORNEY Sept. 8, 1959  C. O. HOLYCROSS ET AL  2,903,236
REINFORCED NON-POROUS VALVE BODY
Filed March 21, 1955  2 Sheets-Sheet 2
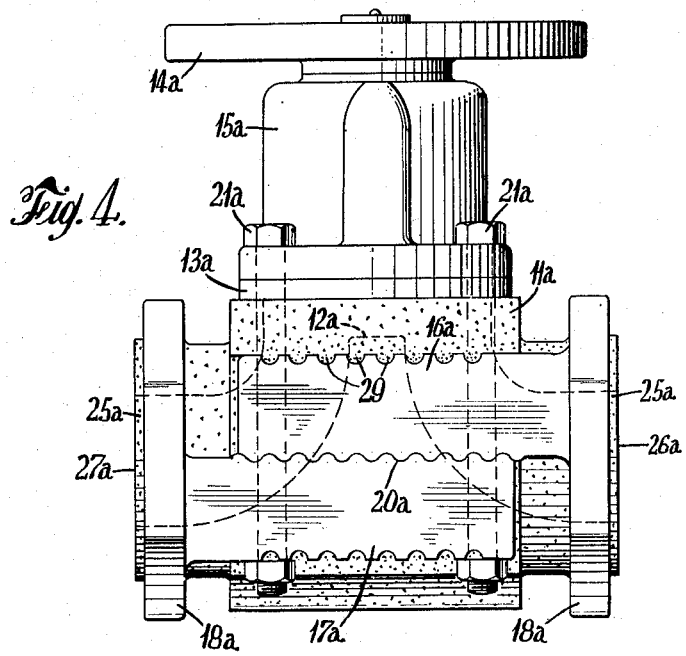
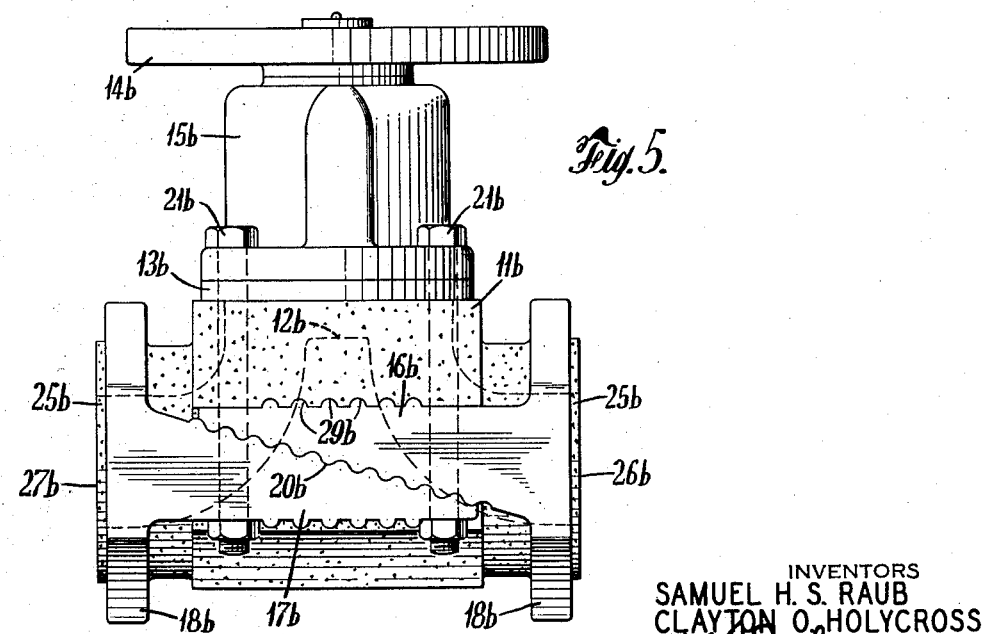
INVENTORS
SAMUEL H. S. RAUB
CLAYTON O. HOLYCROSS
BY
ATTORNEY

2,903,236

REINFORCED NON-POROUS VALVE BODY

Clayton O. Holycross, Cleveland, and Samuel H. S. Raub, Bay Village, Ohio, assignors to Union Carbide Corporation, a corporation of New York Application March 21, 1955, Serial No. 495,632

4 Claims. (Cl. 251—366)

This invention relates to an impervious valve body of carbon of the type used with a wide variety of chemicals and has for an object to reinforce the valve body against the danger of fracture. Another object is to provide such a valve capable of being readily connected and disconnected with the usual piping. Yet a further object is to place such a valve body under compression both longitudinally and transversely thereof to reduce likelihood of fracture.

A valve body of non-porous or impervious carbon has heretofore been used for acids and other corrosive chemicals. It has frequently been made of the Saunders type having a central rib or weir between inlet and outlet passages with a flexible diaphragm capable of seating on said rib or weir, the diaphragm constituting a movable valve element for opening or closing or throttling said passages. The valve body has been provided with supporting flanges at each longitudinal end thereof to which the inlet and outlet pipes are connected. An objection to this construction has been the structural weakness of the impervious body under tension or flexure incident to its use and to its being connected with the usual pipes.

According to this invention such structural weakness has been overcome by the provision of a metal frame to take any stresses of flexure or tension. Specifically this frame is placed under tension longitudinally of the body so that the carbon body may be placed under compression inasmuch as it is stronger under compression than under any other type of stress. Still more specifically this metal frame comprises complementary halves, each having an end plate or connecting flange from which project a pair of longitudinal arms clamped to the valve body by bolts extending through them.

Referring to the drawings, Fig. 1 is a side view of a preferred embodiment of this invention. Fig. 2 is an end view partly in section of the valve of Fig. 1. Fig. 3 shows one of the half portions constituting the metal frame. Fig. 4 shows a modified construction and Fig. 5 is still another embodiment of the present invention.

This invention is shown embodied in a usual Saunders type of non-porous valve body 11 of carbon having therein the longitudinal passageways shown by dotted lines in Fig. 1 terminating in a weir 12 constituting a stationary valve element between the generally transverse passageways each side of the weir. In a valve of this type a diaphragm 13 of polytetrafluoroethylene or of neoprene or other well known chemical type rubber or flexible plastic constitutes the movable valve element controlled by a threaded stem not shown actuated by the handwheel 14 shown on top of the bonnet 15. Such a diaphragm usually has a central portion which is adapted to be flexed upwardly or downwardly in valve opening or closing or throttling positions.

Referring to Figs. 1 and 2, the metal frame comprises a pair of end flanges 18, 18' preferably made of cast iron or steel, each flange having a pair of parallel projecting arms 16, 17. The arms 16, 17 may be oppositely tapered and provided with interfitting projections and recesses 20 to prevent relative movement therebetween in a longitudinal direction. The body 11 is recessed on opposite sides to define a pair of oppositely projecting shoulders 11' in the upper region of the body, and to accommodate the frame arms 16, 17. In assembly, the frame arms 16, 17 straddle the valve body 11 in snug engagement with the underside of shoulders 11', and are flush mounted with respect to the outer side surfaces of the shoulders. The carbon valve body and metal frame are clamped in position by means of a suitable number of bolts 21, which pass through transverse openings 22, 23 in the arms 16, 17 and registering apertures 24 in the shoulders 11', the bolts acting to place the shoulders 11' under a compressive stress. Bolts holes 19 in the end flanges 18, 18' are provided to connect the valve body 11 of flanged piping. In this manner it is possible to connect the metal frame to flanged piping and place the entire frame under a longitudinally tensile force due to tightening of the connecting bolts 19, while still retaining the carbonaceous valve shoulders 11' under transverse compression. Simultaneously with the application of tensile forces in the metal frame, the valve body 11 is squeezed between the abutting pipe flanges at either end, and thereby placed under a longitudinal compressive stress.

The embodiment illustrated in Fig. 4 has a body portion 11a of slightly different shape and the frame halves have arms 16a and 17a which are not tapered but project from the end flanges 18a. The interfitting projections and recesses 20a enable the frame half portions to be securely bolted to the body portion 11a of the valve. Along the top of the arm 16a are shown recesses which cooperate with rounded projections 29 on the body portion of the valve. Each of the end flanges 18a is connected to the usual piping in the manner described above in connection with Fig. 1.

In Fig. 5 is shown still another embodiment of this invention in which the frame arms are tapered as was the case in Fig. 1 and in which the body portion 11b is provided with recesses 29b which cooperate with rounded projections along the top of the arm 16b.

In each embodiment illustrated the frame when bolted to the connecting inlet and outlet pipes is placed under tension by the bolts 28. At the same time the end faces 26, 27 of the carbon body which are in abutting contact with the flange pipes 30, are placed under longitudinal compression as the bolts 28 are tightened. Thus the carbon body 11 may be under compression, both transversely and longitudinally, while the valve frame is under a longitudinal tensile stress. Thus the metal frame carries the load of the attached piping as well as does the bonnet. To facilitate quick dis-assembly it has been found that a thermosetting phenol formaldehyde resinous cement will stick to the impervious carbon body but not to the iron frame when such frame is coated with a vinyl resin paint. The projections and recesses illustrated in the drawing may be of other shapes. The supporting frame is adapted for use with impervious carbon bodies for other types of valves than the Saunders type illustrated. Before this invention the connections are made through flanges used on the impervious carbon body. The contours used for the inlet and outlet passageways of the valve body are shaped to be capable of being molded.

We claim:

1. A valve body of impervious carbon, actuating mechanism for a valve element contiguous said body, a metal frame extending longitudinally of said body, means for clamping said mechanism, frame and body together as a unit and placing a lateral portion of said body under compression transversely thereof, a portion of said means for clamping said mechanism passing through said lateral portion of said body and clamping means at each end of said frame whereby said body may be clamped between inlet and outlet passageways with said frame under longitudinal tension and said body under compression longitudinally.

2. In a valve body of impervious carbon, having at one end an inlet opening, and at the other end an outlet opening, a pair of laterally extending shoulder portions between said inlet and said outlet, and an actuating mechanism for a valve element of said valve body contiguous said shoulder portions, the improvement of a protective metal frame for joining said inlet and said outlet to abutting flanged piping, said metal frame comprising a pair of spaced annular flanges loosely receivable about said inlet and outlet ends, respectively, and disposed in registry with said flanged piping, each of said annular flanges having a pair of frame arms straddling said valve body, and disposed with respect to said actuating mechanism on the opposite side of said shoulder portion, clamping means passing through said shoulder portions for fixedly securing said valve actuating mechanism and said frame arms to said shoulder portions and impressing a transverse compressive stress thereon, and tension means for connecting said frame flanges to said flanged piping, whereby said body is placed under a longitudinal compressive stress, while said metal frame is in tension.

3. In a valve body of impervious carbon, having at one end an inlet opening, and at the other end an outlet opening, a pair of shoulder portions extending transversely laterally of said valve body between said inlet and said outlet, and an actuating mechanism therefor, the improvement of a protective metal frame for joining said inlet and said outlet to abutting flanged piping, said metal frame comprising a pair of spaced annular flanges loosely receivable about said inlet and outlet ends, respectively, and disposed in registry with said flanged piping, each of said annular flanges having a pair of frame arms straddling said valve body, and disposed with respect to said actuating mechanism on the opposite side of said shoulder portion, clamping means for fixedly securing said frame arms to said shoulder portions and to each other and impressing a transverse compressive stress on said shoulder portions, and tension means for connecting said frame flanges to said flanged piping, whereby said body is placed under a longitudinal compressive stress, while said metal frame is in tension.

4. In combination with a relatively low tensile strength, relatively high compressive strength carbonaceous valve body, a pair of metal frames, each frame having an annular flange disposed about the respective ends of said carbonaceous valve body, a pair of frame arms straddling said valve body said frame arms being secured to each other, clamping means for fixedly securing said frame to said valve body whereby the application of a longitudinal tensile force to said metal frame impressed a longitudinal compressive stress in said valve body.

References Cited in the file of this patent

UNITED STATES PATENTS

| | | |
|---|---|---|
| 1,562,195 | Schenck | Nov. 17, 1925 |
| 1,783,281 | Cox | Dec. 2, 1930 |
| 1,787,628 | Jones | Jan. 6, 1931 |

FOREIGN PATENTS

| | | |
|---|---|---|
| 154,456 | Germany | Aug. 31, 1904 |
| 743,704 | France | Jan. 16, 1933 |
| 638,145 | Great Britain | May 31, 1950 |